(12) United States Patent
Leisner et al.

(10) Patent No.: US 9,839,948 B2
(45) Date of Patent: Dec. 12, 2017

(54) FUME EVACUATION SYSTEM

(71) Applicant: Illinois Tool Works Inc., Glenview, IL (US)

(72) Inventors: John C. Leisner, Appleton, WI (US); Brian J. Hammers, Appleton, WI (US); Allan T. Hilbert, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 764 days.

(21) Appl. No.: 13/753,398

(22) Filed: Jan. 29, 2013

(65) Prior Publication Data

US 2014/0213164 A1    Jul. 31, 2014

(51) Int. Cl.
*B08B 15/02* (2006.01)
*B08B 15/00* (2006.01)
*B23K 9/32* (2006.01)
*B23K 26/142* (2014.01)

(52) U.S. Cl.
CPC .............. *B08B 15/002* (2013.01); *B23K 9/32* (2013.01); *B23K 26/142* (2015.10)

(58) Field of Classification Search
CPC .... B23K 26/1405; B23K 9/32; B08B 15/002; B08B 15/02; A47L 9/125; A47L 9/1666; B01D 2275/201; B01D 2279/55; B01D 46/0024; B01D 46/0036; B01D 46/24; B01D 50/002; B07B 4/02; B07B 7/00;
(Continued)

(56) References Cited

U.S. PATENT DOCUMENTS 2,185,919 A   1/1940   Kurth
2,210,458 A   8/1940   Keilholtz
2,289,474 A   7/1942   Anderson
(Continued)

FOREIGN PATENT DOCUMENTS

AU   637737   6/1993
CH   682512   9/1993
(Continued)

OTHER PUBLICATIONS

International Search Report from PCT application No. PCT/US2014/036956, dated Aug. 29, 2014, 14 pgs.
(Continued)

*Primary Examiner* — Steven B McAllister
*Assistant Examiner* — Jonathan Cotov
(74) *Attorney, Agent, or Firm* — McAndrews, Held & Malloy, Ltd.

(57) ABSTRACT

A fume evacuation system is designed to remove smoke, fumes, and particulate from a metal-working or other application. The system may include a cart-type base unit or may be incorporated into a fixed or semi-fixed installation that uses suction to draw air (e.g., containing smoke, fumes, and particulate) away from the metal-working application. The fume evacuation system includes a hood that creates an arduous flow path and varying velocity profile, which cools and separates any particulate matter in the suctioned air. The arduous flow path may include multiple sharp turns created by an inner deflector component and an inlet tube. The inlet tube may further contain baffles to cool particulates from the suctioned air.

19 Claims, 4 Drawing Sheets

(58) Field of Classification Search
CPC ..... B07B 7/01; B07B 7/04; B07B 9/02; C02F 1/283; C02F 1/32; C02F 1/36; C02F 1/38
USPC ..................................................... 454/65, 67
See application file for complete search history.

(56) References Cited

U.S. PATENT DOCUMENTS

| | | | |
|---|---|---|---|
| 2,367,104 A | 1/1945 | Demuth | |
| RE24,637 E | 4/1959 | Wulle | |
| 2,910,558 A | 10/1959 | Engelhardt | |
| 3,318,227 A | 5/1967 | Nelson | |
| 3,364,664 A | 1/1968 | Doane | |
| 3,430,551 A * | 3/1969 | Hauville | B01D 46/00 454/65 |
| 3,487,767 A | 1/1970 | Kristiansen | |
| 4,016,398 A | 4/1977 | Herrick | |
| 4,033,846 A * | 7/1977 | Engesland | B08B 15/02 204/247 |
| 4,043,257 A | 8/1977 | Aaberg | |
| 4,158,462 A | 6/1979 | Coral | |
| 4,160,407 A | 7/1979 | Duym | |
| 4,163,650 A | 8/1979 | Bonham | |
| RE31,266 E * | 6/1983 | Engesland | B08B 15/02 204/247 |
| 4,450,756 A | 5/1984 | Kling | |
| 4,493,970 A | 1/1985 | Rieppel | |
| 4,502,375 A | 3/1985 | Hignite | |
| 4,552,059 A | 11/1985 | Potter | |
| 4,607,614 A | 8/1986 | Higashino | |
| 4,717,805 A | 1/1988 | Miyagawa | |
| 4,823,971 A | 4/1989 | Her | |
| 4,905,716 A | 3/1990 | Hubbard | |
| 5,058,490 A | 10/1991 | Sodec | |
| 5,069,197 A | 12/1991 | Wisting | |
| 5,223,005 A | 6/1993 | Avondoglio | |
| 5,263,897 A | 11/1993 | Kondo | |
| 5,281,246 A * | 1/1994 | Ray et al. | 55/302 |
| 5,395,410 A | 3/1995 | Jang | |
| 5,410,120 A | 4/1995 | Taylor | |
| 5,427,569 A * | 6/1995 | Plymoth | 454/65 |
| 5,540,214 A | 7/1996 | Boudreault | |
| 5,713,346 A | 2/1998 | Kuechler | |
| 5,718,219 A | 2/1998 | Boudreault | |
| 5,890,484 A * | 4/1999 | Yamada | F24C 15/20 126/299 D |
| 5,904,751 A * | 5/1999 | Van Niekerk | B01D 46/30 55/385.1 |
| 6,037,725 A | 3/2000 | Tolbert, Jr. | |
| 6,099,607 A | 8/2000 | Haslebacher | |
| 6,332,837 B1 | 12/2001 | Wilk | |
| 6,358,137 B1 | 3/2002 | Threlfall | |
| 6,569,008 B1 * | 5/2003 | Chang | B01D 46/003 126/299 F |
| 6,607,573 B1 | 8/2003 | Chaurushia | |
| 6,616,720 B1 | 9/2003 | Smith | |
| 6,620,038 B1 | 9/2003 | Kikuchi | |
| 6,632,132 B1 | 10/2003 | Kikuchi | |
| 6,780,213 B2 | 8/2004 | Chang | |
| 6,913,014 B2 * | 7/2005 | Chiang | F24C 15/20 126/299 D |
| 7,000,634 B2 | 2/2006 | Lindborg | |
| 7,959,696 B2 | 6/2011 | Martic | |
| 8,176,766 B1 * | 5/2012 | Ruiz et al. | 73/23.3 |
| 8,211,194 B2 | 7/2012 | Takayanagi | |
| 8,312,873 B2 | 11/2012 | Gagas | |
| 8,460,417 B2 | 6/2013 | Reid | |
| 8,892,222 B2 | 11/2014 | Simms | |
| 2002/0039881 A1 | 4/2002 | Coral | |
| 2003/0181158 A1 | 9/2003 | Schell | |
| 2005/0170767 A1 * | 8/2005 | Enzenroth | B08B 15/002 454/36 |
| 2005/0204582 A1 * | 9/2005 | Rossi | B08B 15/002 34/551 |
| 2006/0157048 A1 | 7/2006 | Heilman | |
| 2007/0202791 A1 * | 8/2007 | Lee | B08B 15/02 454/49 |
| 2007/0281598 A1 * | 12/2007 | Huang | B08B 15/02 454/56 |
| 2008/0305731 A1 | 12/2008 | Reid | |
| 2009/0088060 A1 | 4/2009 | Arnold | |
| 2009/0321403 A1 | 12/2009 | Brenneke | |
| 2010/0206799 A1 * | 8/2010 | Leavitt et al. | 210/314 |
| 2010/0282728 A1 | 11/2010 | Cole | |
| 2012/0111845 A1 | 5/2012 | Simms | |
| 2012/0193334 A1 | 8/2012 | Mehn | |
| 2013/0162177 A1 | 6/2013 | Hofsdal | |
| 2013/0244560 A1 * | 9/2013 | Hammers | B08B 15/02 454/63 |
| 2014/0214213 A1 | 7/2014 | Rockenfeller | |

FOREIGN PATENT DOCUMENTS

| | | |
|---|---|---|
| CN | 2146665 | 11/1993 |
| CN | 2225253 | 4/1996 |
| CN | 2413708 | 1/2001 |
| CN | 1384909 | 12/2002 |
| CN | 200984583 | 12/2007 |
| CN | 101327109 | 12/2008 |
| CN | 101332392 | 12/2008 |
| CN | 101526239 | 9/2009 |
| CN | 201609707 | 10/2010 |
| CN | 202087569 | 12/2011 |
| CN | 102483240 | 5/2012 |
| CN | 102699002 | 10/2012 |
| DE | 1604293 | 9/1970 |
| DE | 3412204 | 10/1985 |
| DE | 4413600 | 11/1995 |
| DE | 10020736 | 10/2001 |
| DE | 20221100 | 1/2005 |
| DE | 102005016721 | 10/2006 |
| DE | 102005033224 | 7/2007 |
| DE | 102006055001 | 5/2008 |
| DE | 102009030220 | 12/2010 |
| EP | 0511576 | 11/1992 |
| EP | 0536871 | 4/1993 |
| EP | 1227283 | 7/2002 |
| EP | 1967796 | 9/2008 |
| EP | 2368646 | 9/2011 |
| EP | 2422865 | 2/2012 |
| FR | 2613551 | 10/1988 |
| FR | 2911520 | 7/2008 |
| GB | 546878 | 8/1942 |
| GB | 1069868 A | 5/1967 |
| GB | 2030825 | 5/1980 |
| GB | 2032825 A | 5/1980 |
| JP | S54147647 | 11/1979 |
| JP | H01179841 | 7/1989 |
| JP | H04063183 | 2/1992 |
| JP | H06292970 | 10/1994 |
| JP | H10288371 | 10/1998 |
| WO | 0048752 A1 | 8/2000 |
| WO | 0184054 | 11/2001 |
| WO | 2004088812 | 10/2004 |
| WO | 2005022046 | 3/2005 |
| WO | 2005045323 | 5/2005 |
| WO | 2005106337 | 11/2005 |
| WO | 2008032571 | 3/2008 |

OTHER PUBLICATIONS

International Search Report from PCT application No. PCT/US2014/044119, dated Sep. 10, 2014, 10 pgs.
International Search Report & Written Opinion of PCT/US2012/022599 dated May 2, 2012.
International Search Report from PCT application No. PCT/US2012/064081 dated Feb. 14, 2013, 12 pgs.
International Search Report from PCT application No. PCT/US2013/031237 dated Jul. 23, 2013, 11 pgs.
International Search Report from PCT application No. PCT/US2013/031261 dated Jul. 25, 2013, 13 pgs.

(56) References Cited

OTHER PUBLICATIONS

International Search Report from PCT application No. PCT/US2013/030694 dated Aug. 20, 2013, 15 pgs.
International Search Report from PCT application No. PCT/US2013/031246 dated Aug. 9, 2013, 13 pgs.
International Search Report from PCT application No. PCT/US2013/031251 dated Aug. 6, 2013, 15 pgs.
International Search Report from PCT application No. PCT/US2013/030697 dated Jul. 30, 2013, 13 pgs.
U.S. Appl. No. 61/611,885, filed Mar. 16, 2012, Bradley G. Carmen.
U.S. Appl. No. 13/610,490, filed Sep. 11, 2012, Brian J. Hammers.
International Search Report from PCT application No. PCT/US2014/011860, dated Apr. 24, 2015, 10 pgs.

* cited by examiner

FUME EVACUATION SYSTEM

BACKGROUND

The disclosure relates generally to fume evacuation systems, such as those used for welding, cutting, metal-working, and similar applications.

Metal working operations range from cutting, welding, soldering, assembly, and other processes that may generate smoke, fumes, and particulate. In smaller shops it may be convenient to open ambient air passages or to use suction or discharge air from fans to maintain air spaces relatively clear. In other applications, cart-type evacuation systems are used. In industrial settings, more complex fixed systems may be employed for evacuating smoke, fumes, and particulate from specific work cells, metal-working locations, and so forth.

In general, such systems often include a hood or other intake coupled to a conduit that draws the smoke, fumes, and particulate from the worksite to various filters, blowers, air recirculation and exhaust components. The evacuation system uses suction air to draw the smoke, fumes, and particulate from the immediate vicinity of the metal-working operation. Further improvements are needed, however, in evacuation systems. For example, it would be desirable to cool particulate at an early stage within the evacuation system, such that the particulate does not contact and damage any other components of the evacuation system.

There is a need, therefore, for improved extraction systems for welding and similar metal-working applications.

BRIEF DESCRIPTION

The present disclosure provides novel approaches to smoke, fume, and spark extraction designed to respond to such needs. The systems are particularly adapted for welding, cutting, and similar metal-working operations that can generate fumes, smoke, hot gases, but also particulate matter. In accordance with certain aspects of the disclosure, an evacuation hood includes a conical outer shroud and an inner deflector. The inner deflector is disposed within the outer shroud to define a pathway having multiple sharp turns. As such, the smoke, fumes, and particulate are subjected to an arduous pathway, causing the particulate to cool.

In accordance with certain aspects, the disclosure offers an evacuation system that includes an air handling system for drawing fumes away from a metal-working application. An air conduit is coupled to the air handling system for conveying the smoke, fumes, and other metal-working byproducts away from the metal-working application. Further, a hood is coupled to the air conduit and positioned at the metal-working application. As described, the hood includes an outer shroud with an inner deflector disposed within the outer shroud, which defines a first sharp turn for metal-working byproducts drawn between the outer shroud and inner deflector. An inlet tube is disposed in the inner deflector, and the inner deflector and the inlet tube define a second sharp turn for the metal-working byproducts.

In accordance with a further aspect, the disclosure provides an evacuation system again having an air handling system and an air conduit coupled to the air handling system. Again, a hood is coupled to the air conduit and positioned at the metal-working application. The hood includes a structure defining a circuitous path for the smoke, fumes, and particulate. During operation, the circuitous path allows fumes to pass through the hood and into the air conduit but causes particulates to cool.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
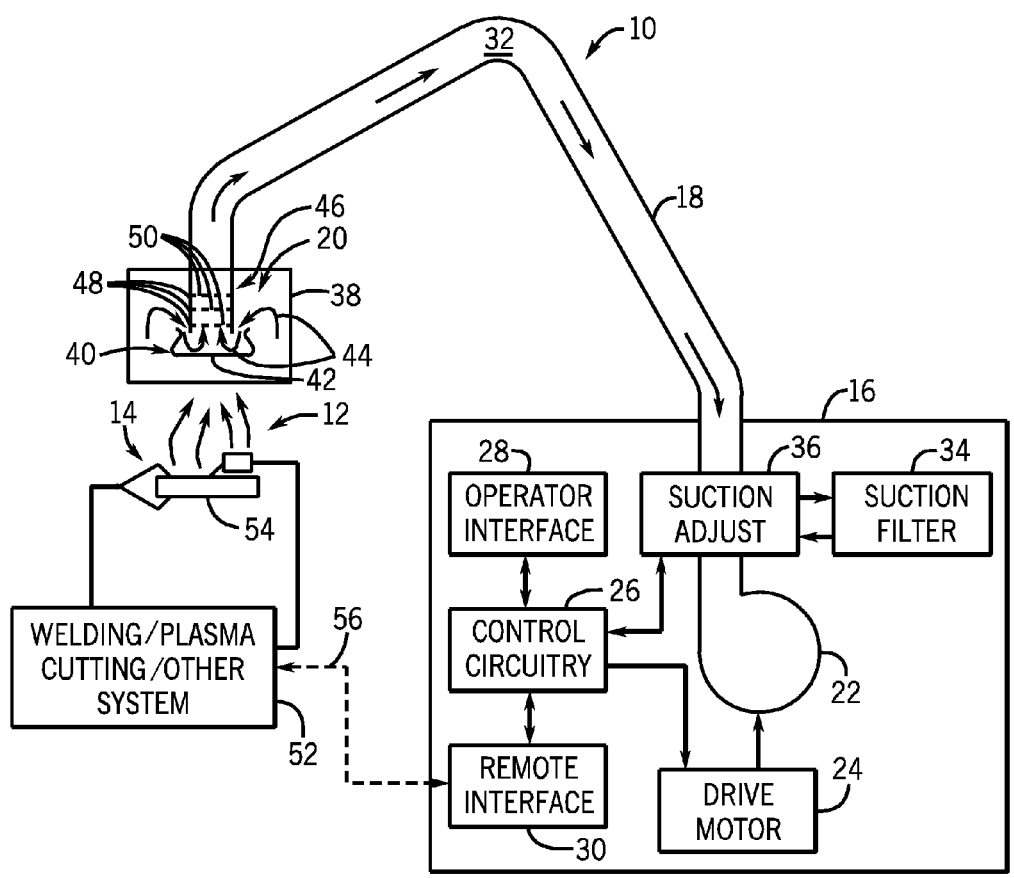
FIG. 1 is a diagrammatical representation of a cart-like fume evacuator in accordance with aspects of the present techniques.

Turning now to the drawings, and referring first to FIG. 1, an evacuation system 10 is illustrated for extracting smoke, fumes, particulate, and more generally, workspace air 12 from a metal-working or other application 14. In the illustrated embodiment, the evacuation system 10 includes a base unit 16 coupled to a conduit 18 that draws air away from the metal-working application 14 using a hood 20. The hood 20 is designed to be placed at or near (generally above) the metal-working operation 14 and, as the base unit 16 is activated, evacuates the workspace air 12, directing the evacuated air to the base unit 16 for processing.

It should be noted that while described with respect to the stand-alone base unit 16 in certain embodiments, the present disclosure is not limited to this embodiment, and may be used in conjunction with a cart type unit, a fixed installation, or a different physical configuration. More generally, innovations provided by and described in the present disclosure may be implemented into fixed or semi-fixed installations, such as those used in industrial settings. That is, certain components of the base unit 16 described herein may serve multiple workspaces, work cells, weld cells, and so forth, by common conduits 18 that that draws air away from multiple metal-working applications 14. Operator controls, where provided as described below, may be positioned remotely from these workspaces, or within the workspaces for control of flow from the particular workspace.

Returning to FIG. 1, as illustrated, the base unit 16 comprises a blower 22, such as a squirrel-cage blower, driven by a drive motor 24. The drive motor 24 is controlled by control circuitry 26 which may provide drive signals to the drive motor 24 for fixed-speed or variable-speed operation. The base unit 16 may be designed to draw power from any source, such as a power grid, battery sources, engine-generator sets, and so forth. The control circuitry 26 typically includes processing circuitry and memory for carrying out drive operations as desired by the operator or in response to system inputs. Accordingly, the control circuitry 26 may communicate with an operator interface 28 for receiving operator settings, speed settings, on-off commands, and so forth. Similarly, the control circuitry 26 may communicated with a remote interface 30 designed to receive signals from remote inputs, remote systems, and so forth. The remote interface 30 may also provide data to such remote systems such as monitoring and controlling operation of the evacuation system 10.

In the illustrated embodiments, the conduit 18 extending between the base unit 16 and the hood 20 may be a suction conduit 32. In general, the suction conduit 32 is under a negative or slight suction pressure to draw air, containing smoke, fumes, and particulate, away from the workspace. The air travelling from the hood 20 through the suction conduit 32 may be directed through a suction filter 34 before being reintroduced into the blower 22. To further optimize the operation of the evacuation system 10, suction adjustment 36 may be provided prior to the suction filter 34. The suction adjustment 36 is shown within the base unit 16, but may also be located within the conduit 18. The suction adjustment 36 may include, for example, a butterfly valve, a damper, a louver, baffles, guide vanes, or another mechanical device which may be adjusted to limit the flow rate of air from the suction filter 34 and, consequently, the intake of air into the blower 22 from the ambient surroundings. Such adjustment may advantageously allow for relative mass or volumetric flow rates of the suction airstream to enhance extraction of workspace air containing metal-working byproducts. The control circuitry 26 may be coupled to the suction adjustment 36 to regulate its operation (e.g., via small adjustment motors and actuator assemblies).

In the embodiment illustrated in FIG. 1, the hood 20 has an outer shroud 38, which is generally conical in shape in exemplary embodiments. An inner deflector 40 is disposed within the outer shroud 38 to define a first sharp turn in the flow path within the hood 20. The deflector 40 may have a solid bottom surface 42, which prevents the fumes, smoke, and particulate from flowing directly into the conduit 32 from the hood 20. Accordingly, the solid bottom surface 42 may create an arduous flow path within the hood 20 to cool any particulate and may cause it to drop out of the air flow. The suction provided by the blower 22 may enable the flow path to travel around the deflector 40 as shown by arrows 44. An inlet tube 46 may aid in creating the arduous flow path, while also directing the flow into the suction conduit 32. To improve spark removal, the inlet tube 46 may house at least one baffle 48. For example, in the depicted embodiments, the inlet tube contains three baffles 48, each having a plurality of apertures 50. As described below, each baffle 48 may contain apertures 50 of a different size and different alignment.

It should also be noted that the evacuation system 10 may be adapted to exchange data with other system components, such as a welding/plasma cutting or other system 52. In the illustrated embodiment, the system 52 may be, for example, welding or plasma cutting power supplies, wire feeders, shielding gas supplies, and so forth. These will typically be coupled to the operation to accomplish the desired task on a work piece 54. Certain of these systems may be capable of providing control signals to the evacuation system 10 to allow for turning the evacuation system 10 on and off, regulating speeds and air flows, and so forth. Such communications may be provided via suitable cabling 56, by wireless communications, or by other means.

Figure 2:
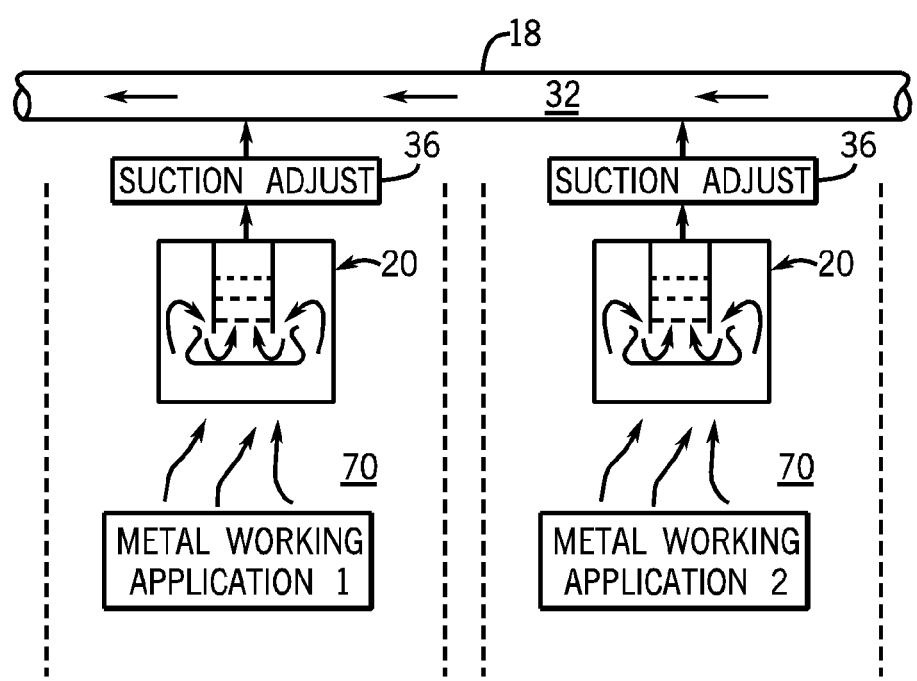
FIG. 2 is a diagrammatical representation of fixed or semi-fixed installations utilizing the techniques described herein.

As mentioned above, the present techniques may be employed in systems and arrangements other than carts or base units that are local to a work location. FIG. 2 illustrates an exemplary fixed or semi-fixed system that may be employed in work areas 70 in workshops, factories, assembly and metalworking plants, and so forth. The common suction conduit 34 draws air from multiple metal-working applications 14. In this sense, the conduit 18 forms headers or manifolds that may be positioned over the work areas or otherwise routed between them. Each work area, then, is provided with a respective hood 20 for extracting smoke, fumes, and particulate, as well as respective suction adjustments 36. These may operate manually or electrically, as mentioned above in the case of the cart-type embodiment.

Figure 3:
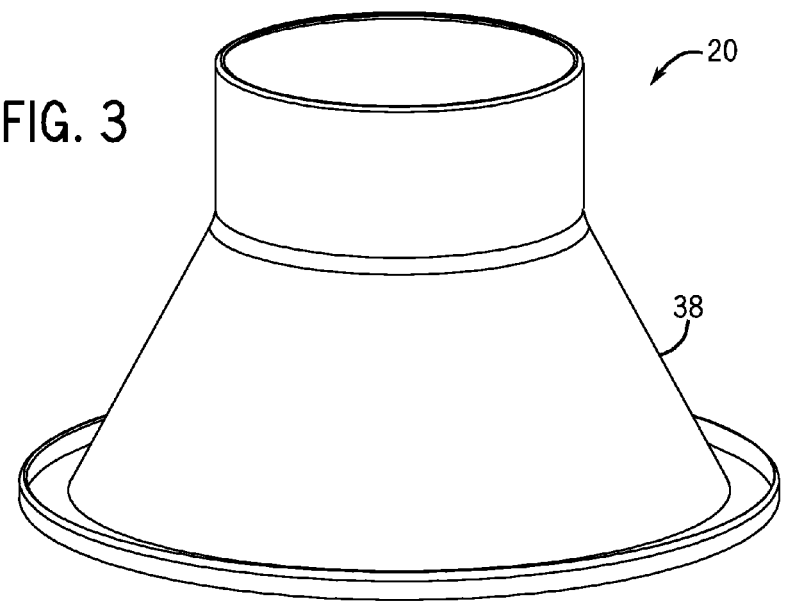
FIG. 3 is a perspective view of an exemplary hood for drawing metal-working byproducts away from a metal-working application.

FIG. 3 is a perspective view of an exemplary hood 20 in accordance with certain aspects of the present techniques. As shown, the hood 20 includes the outer shroud 38, which may be generally conical in shape. As discussed in detail below, the outer shroud 38 encloses additional components of the hood 20 that may be useful in cooling and separating any particulate from the air removed from the workspace. Particularly, components within the hood 20 may create an arduous flow path for the removed air to facilitate cooling and particulate separation. It may be beneficial to remove and cool any particulate in the hood 20.

Figure 4:
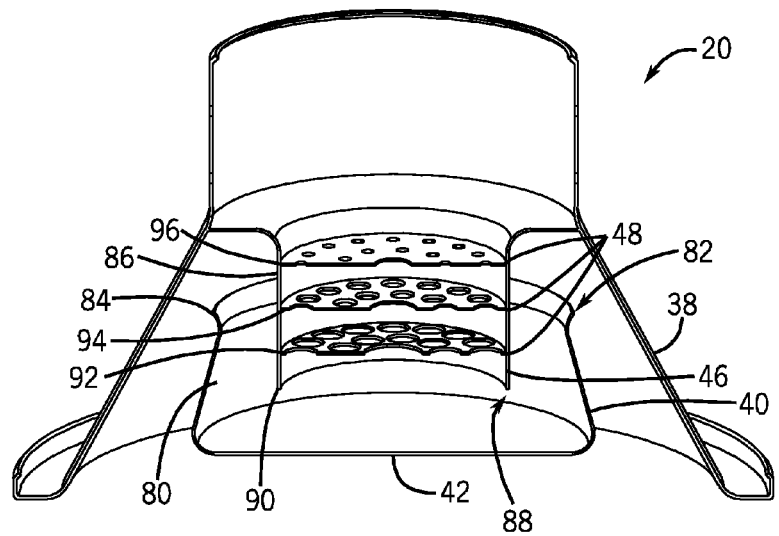
FIG. 4 is a cross-sectional view of the hood in FIG. 3.

FIG. 4 is a perspective cross-sectional view of the hood 20, providing a more detailed view of the components internal to the outer shroud 38. As shown, the inner deflector 40 is disposed within the outer shroud 38. The inner deflector 40 has a solid flat surface 42 oriented perpendicular to the direction of flow into the hood 20 used to create an arduous flow path for suctioned air. The surface 42 blocks the suctioned air flow from flowing directly into the inlet tube 46 and the suction conduit 32. Specifically, the surface 42 may force the suctioned air around the inner deflector 40, between a side wall 80 of the inner deflector 40 and the conical surface of the outer shroud 38. Due to the suction provided by the blower 22, the suctioned air may then encounter a first sharp turn 82 about a rounded edge 84 of the inner deflector 40. The first sharp turn 82 may be between approximately 90° and 180°. The suctioned air then travels through a passageway formed by the side wall 80 of the inner deflector 40 and an outer surface 86 of the inlet tube 46. Again, the suctioned air is impacted by the surface 42 of the inner deflector 40, imposing a second sharp turn 88 in the flow path about an edge 90 of the inlet tube 46. The second sharp turn 88 may be between approximately 90° and 180°.

The inlet tube 46 contains multiple baffles 48 to prevent any particulate from passing through the hood 20. In the depicted embodiment, three baffles 48 are shown. Each baffle 48 has a plurality of apertures 50 to enable the suctioned air to pass through the baffle 48 and into the suction conduit 32. In certain embodiments, the baffles 48 may have apertures 50 of varying sizes and placement. The size of the apertures 50 may vary among the baffles 48 to impose a varying velocity profile on the suctioned air. Further, the apertures 50 may include varying alignment to create additional turns within the flow path. However, in other embodiments, components other than baffles 48 may be used. For example, mesh screens (metal, plastic, or otherwise) may be used to block particulate while allowing suctioned air to travel through the inlet tube 46. Further, any number of baffles 48 may be contained within the inlet tube 46.

Figure 5:
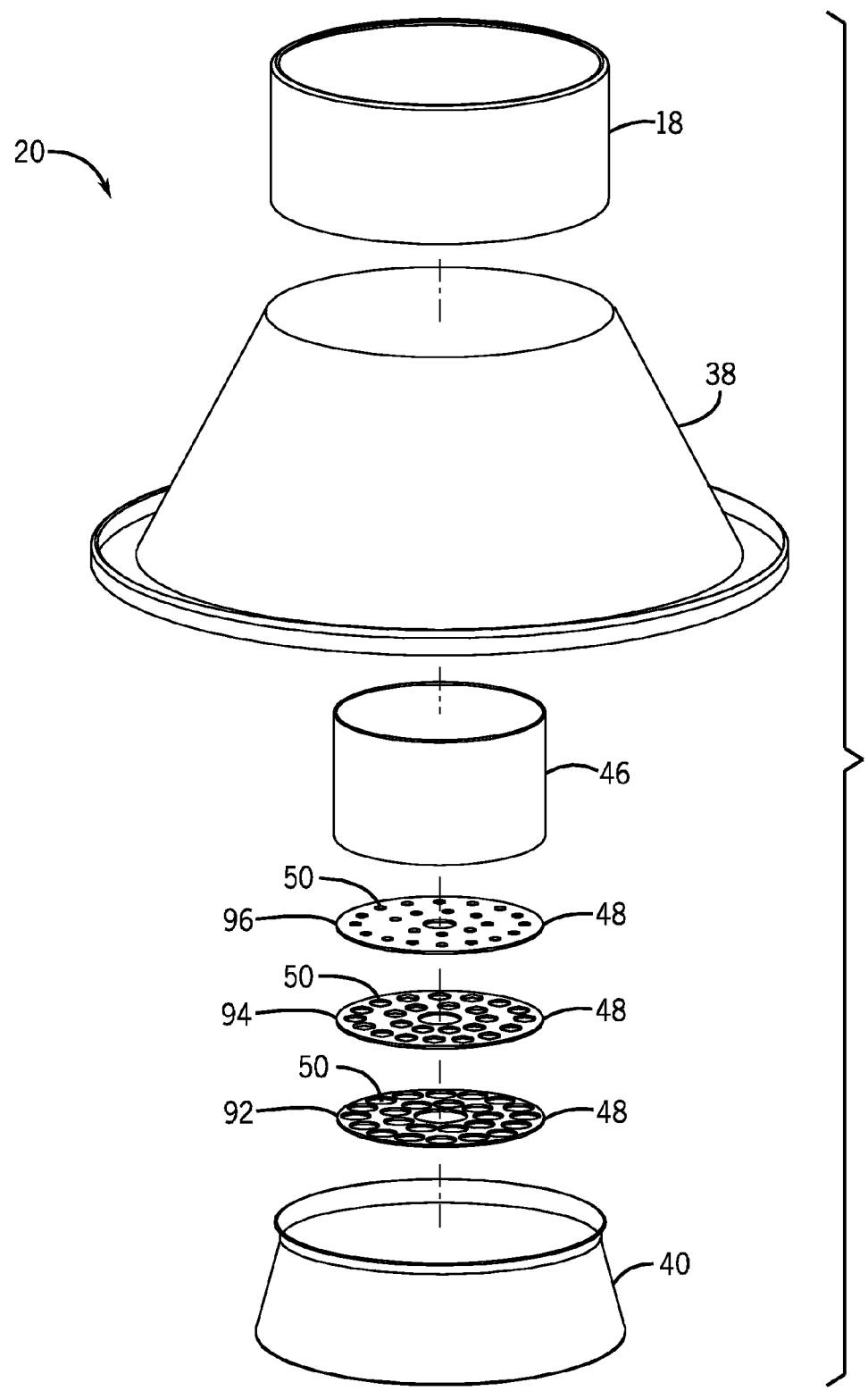
FIG. 5 is an exploded view of the hood in FIG. 3.

FIG. 5 is an exploded view of the hood 20, depicting how the internal components of the hood 20 are arranged. For example, the baffles 48 may be fixed within the inlet tube 46 prior to the inlet tube 46 being placed within the outer shroud 38. In certain embodiments, the baffles 48 may be formed as part of the inlet tube 46. Further, the inlet tube 46 and outer shroud 38 may be coupled with an interference fit, tabs, a snap fit mechanism, a weld, braze, an adhesive, or otherwise. The inner deflector 40 may then be disposed over the downstream end of the inlet tube 46 to direct flow around the sharp turns 82 and 88, causing particulate to fall out of the flow path.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An evacuation system comprising:
an air handling system for drawing components comprising air, fumes, smoke, sparks, or particulate, or a combination thereof from a metal working application;
an air conduit coupled to the air handling system for conveying the components from the material working application towards the air handling system; and
a hood coupled to the air conduit and configured to be positioned at the material working application, the hood comprising a conical outer shroud, an inner deflector disposed in the outer shroud and defining a first sharp turn for the components drawn between the outer shroud and the inner deflector, wherein the conical outer shroud has an opening that is larger than the inner deflector to form an open annular flow path that in operation draws the components into the hood, and an inlet tube that extends into the inner deflector and defining with the inner deflector a flow path between a sidewall of the inner deflector and an outer surface of the inlet tube and a second sharp turn for the components, wherein the open annular flow path, the first sharp turn, and the second sharp turn define an arduous flow path that in operation cools the components, causes drop out of the particulate, or both.

2. The system of claim 1, comprising at least one particulate baffle disposed in the inlet tube.

3. The system of claim 2, wherein the at least one particulate baffle comprises a plate-like structure having a plurality of apertures through which the components may pass.

4. The system of claim 2, comprising a plurality of particulate baffles disposed in the inlet tube.

5. The system of claim 4, wherein each of the plurality of particulate baffles comprises a plate-like structure having a plurality of apertures through which the components may pass.

6. The system of claim 5, wherein the apertures of an upstream baffle, in the direction of the component movement, are differently sized than apertures of a downstream baffle.

7. The system of claim 1, wherein the outer shroud, the inner deflector and the inlet tube are disposed concentrically.

8. The system of claim 1, wherein the inner defector comprises a blind bottom end that precludes the components from entering the inner deflector without passing between the outer shroud and the inner deflector.

9. The system of claim 1, wherein the air handling system comprises a movable cart.

10. The system of claim 9, wherein the air conduit comprises an arm extending from the cart.

11. The system of claim 1, wherein the air handling system and the air conduit comprise a fixed installation.

12. The system of claim 1, wherein the air handling system comprises an air filter for filtering the components drawn from the material working application.

13. An evacuation system comprising:
an air handling system for drawing components comprising air, fumes, smoke, sparks or particulate, or a combination thereof from a metal working application;
an air conduit coupled to the air handling system for conveying the components from the material working application towards the air handling system; and
a hood coupled to the air conduit and configured to be positioned at the material working application, the hood comprising:
a conical outer shroud;
an inner deflector disposed in the outer shroud and defining a first sharp turn for the components drawn between the outer shroud and the inner deflector, wherein the conical outer shroud has an opening that is larger than the inner deflector to form an open annular flow path that in operation draws the components into the hood;
an inlet tube that extends into the inner deflector and defining with the inner deflector a flow path between a sidewall of the inner deflector and an outer surface of the inlet tube and a second sharp turn for the components; and
a plurality of particulate baffles disposed in the inlet tube, wherein each of the plurality of particulate baffles comprises a plate-like structure having a plurality of apertures through which the components may pass;
wherein the open annular flow path, the first sharp turn, and the second sharp turn define an arduous flow path that in operation cools the components, causes drop out of the particulate, or both.

14. The system of claim 13, wherein the apertures of an upstream baffle, in the direction of the component movement, are differently sized than apertures of a downstream baffle.

15. The system of claim 13, wherein the inner defector comprises a blind bottom end that precludes the components from entering the inner deflector without passing between the outer shroud and the inner deflector.

16. The system of claim 13, wherein the air handling system comprises an air filter for filtering the components drawn from the material working application.

17. A hood of an evacuation system for drawing components comprising air, fumes, smoke, sparks, or particulate, or a combination thereof from a metal working application, the hood configured to be coupled to an air conduit and configured to be positioned at the material working application, the hood comprising:
a conical outer shroud;
an inner deflector disposed in the outer shroud and defining a first sharp turn for the components drawn between the outer shroud and the inner deflector, wherein the conical outer shroud has an opening that is larger than the inner deflector to form an open annular flow path that in operation draws the components into the hood;
an inlet tube that extends into the inner deflector and defining with the inner deflector a flow path between a sidewall of the inner deflector and an outer surface of the inlet tube and a second sharp turn for the components; and
a plurality of particulate baffles disposed in the inlet tube, wherein each of the plurality of particulate baffles comprises a plate-like structure having a plurality of apertures through which the components may pass, wherein the apertures of an upstream baffle, in the direction of the component movement, are larger than the apertures of a downstream baffle;

wherein the open annular flow path, the first sharp turn, and the second sharp turn define an arduous flow path that in operation cools the components, causes drop out of the particulate, or both.

18. The system of claim 17, wherein the inner defector comprises a blind bottom end that precludes the components from entering the inner deflector without passing between the outer shroud and the inner deflector.

19. The system of claim 17, wherein the outer shroud, the inner deflector and the inlet tube are disposed concentrically.

* * * * *